No. 790,644. PATENTED MAY 23, 1905.
G. H. LLOYD.
MANUFACTURE OF PIPES.
APPLICATION FILED JUNE 29, 1904.
2 SHEETS—SHEET 1.
FIG. 5
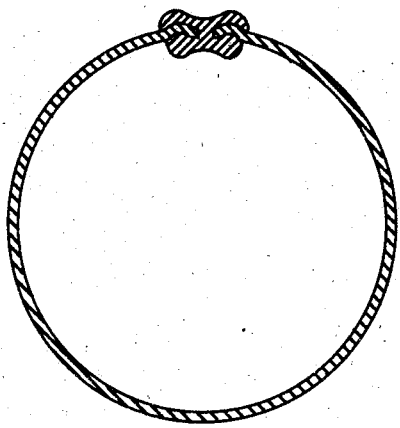
FIG. 1  FIG. 2
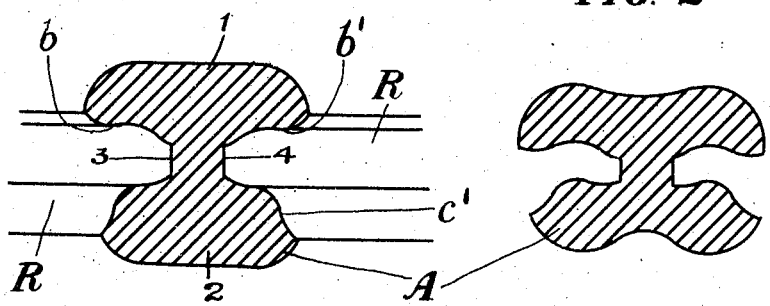
FIG. 3  FIG. 4
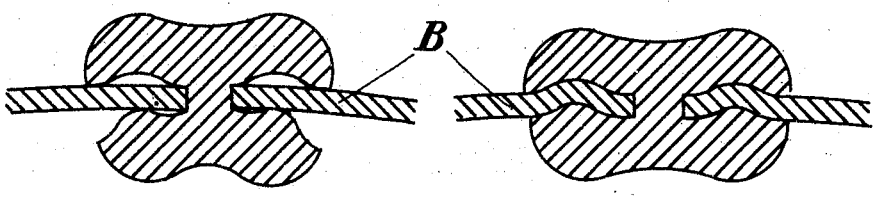
Witnesses
George G. Schoenlank
Thomas Kirkpatrick
Inventor
George Herbert Lloyd
by H. Van Oosanniel
Attorney

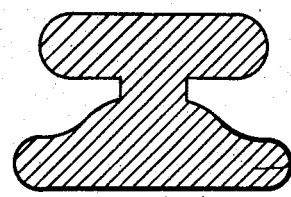
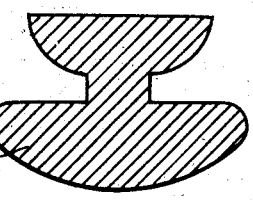
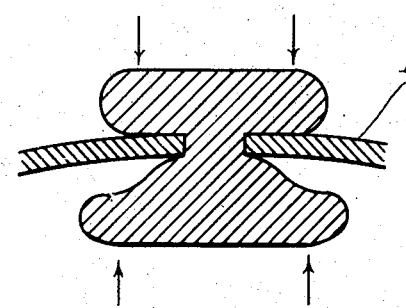
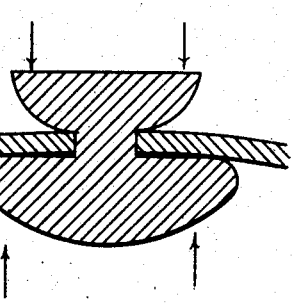
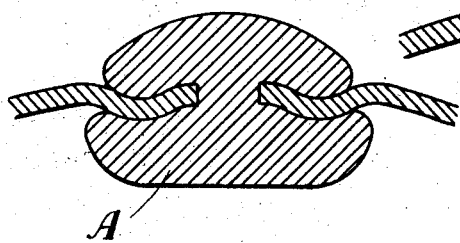
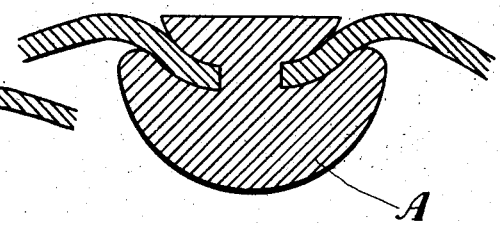

No. 790,644.  
Patented May 23, 1905.

UNITED STATES PATENT OFFICE.

GEORGE HERBERT LLOYD, OF SUTTON COLDFIELD, ENGLAND.

MANUFACTURE OF PIPES.

SPECIFICATION forming part of Letters Patent No. 790,644, dated May 23, 1905.

Application filed June 29, 1904. Serial No. 214,686.

*To all whom it may concern:*

Be it known that I, GEORGE HERBERT LLOYD, director, a subject of the King of Great Britain, residing at Coleshill Lodge, Sutton Coldfield, in the county of Warwick, England, have invented certain new and useful Improvements in the Manufacture of Pipes, of which the following is a specification.

I am quite aware of numerous processes for producing locking-bar joints and the forms of pipe so produced, several of which are well-known commercially. The processes usually consist in "upsetting" the edges to be joined of the plates or sheets which are to be curved into pipes, producing on such edges T or Y or other section tongues or thickening. A margin of the plate is in some cases also crimped or waved juxta to its thickened edge or edges. These specially-prepared edges are then brought into suitable position (usually by curving the plates in special or ordinary machinery, in which curved sheets or pipes are produced) to enter either side into the grooved locking-bar, usually of H-section, the plates or open edges of the bar being forced or rolled tightly together externally and internally behind the "thickened" or "staved-up" edges, so as to lock the joint so produced by these thickened edges. The production of such pipes entails time, work, and often special machinery to upset the edges, which may comprise one or more subprocesses, as when also crimping the margins.

Now by my invention I propose to dispense entirely with the preliminary process of upsetting and crimping the edges of the sheets or plates for making such pipes.

In producing a "locking-bar" pipe by my process I place the sheet or plates from which the pipe is to be made in a suitable rolling or curving machine and bring the edges to be joined toward one another and then into the opposite grooves in the edges of the locking-bar which is specially rolled.

I produce my locking-bar by rolling into a bar of mild steel while hot grooves on two opposite faces, the faces of these grooves being waved during the process of rolling by partly squeezing their faces together onto a die or mandrel, which gives exactly the opening required for introducing the edges of the plate to be joined. These convexities and concavities run lineally and parallel with the bar and are so arranged transversely that the convexity in the one side of a groove would take when the groove was closed together into the concavity of the opposing side of the same groove. Holding this grooved bar horizontally, the edges of my curved plate are placed one in either groove, and the flanges of the grooves are then squeezed tightly together, buckling the margin of plate between their inner surfaces and causing it to assume their waved form. The edges of plate to be joined are thus effectually locked by the corrugated grooves of the locking-bar, and the pipe is thus manufactured from sheet or plate mild steel or other metal.

Of course it will be understood that I employ any well-known machinery or means for bending and curving my plates, for rolling my corrugated grooved locking-bar, and for squeezing the same onto my pipe edges and effecting the joint.

With the object of illustrating the stages in the process of my new manufacture I have appended two sheets of diagrams, upon which the finished joints and a section through a locking-bar pipe, the result of my process, is shown.

Figure 1 is a section of my locking-bar A, which may be produced from mild bar-steel by rolling or hammering and may afterward be rolled in a special mill, such as a Sack's or Grey's mill, parts of the vertical rolls being represented by R R. Fig. 2 is the same section after passing once more through another set of rolls, so squeezing or nipping the waved faces of the grooves nearer together. Fig. 3 shows the edges of the sheet or sheets of the partly-formed pipe inserted ready for squeezing and completing the locking-joint. Fig. 4 shows a section of the joint completed simply by applying pressure as indicated, showing how the borders of the plate or plates are forced to conform to that of the waved faces of the grooves in the locking-bar. Fig. 5 shows an entire transverse section of a pipe manufactured from a single sheet of metal according to my invention. It will be evident that two sheets might be used and two locking-joints be made without in the least deviating from my invention. Fig. 6 is a transverse section of a slightly-varying form of locking-bar made by my process. Fig. 7 shows the margins of the sheet metal inserted ready for the bar to be squeezed on. Fig. 8 shows the joint finished with section Fig. 6. Fig. 9 shows another section, while Fig. 10 shows the margins of the plates inserted ready for the grooves to be closed down and effect the joint shown either by Fig. 11 or Fig. 12, according to which is arranged for.

My improved process of manufacture consists of the following stages: first, the production of a locking-bar A of any of the peculiar sections illustrated by Figs. 1, 6, and 9 or similar section by any well-known method, such as "cogging" a red-hot billet or bloom in cogging-mill to an approximation of that section and then finishing the section to the shape illustrated in Figs. 1, 6, or 9 by rolling in a special mill, such as Sack's or Grey's mills, in which the faces 1 and 2 are produced by the top and bottom rolls, while the opposite grooved faces 3 or 4 are simultaneously rolled in by vertical rollers such as are used in the mills named. It should be carefully noted that the "peculiarity" of my locking-bar consists in the shape of the opposing faces $b'$ $c'$ of each opposite groove 3 and 4, which are rolled, waved, or curved longitudinally with the bar or as per section Fig. 9. They will assume a longitudinal wave when pressed together, and the section A, of whatever outward contour, is of such a strength as compared to that of the plates B and their gage that this waved or curved shape of the opposing grooved faces $b'$ $c'$ of the locking-bar will crimp the margins of such plate or plates inserted therein by the application of pressure.

The second stage of my process of manufacturing a locking-bar pipe consists in passing the section resulting from the first stage through "pass-rolls," and so squeezing the faces $b'$ $c'$ nearer together, the result of which "passing" is clearly seen by comparing Figs. 1 and 2. This stage may or may not be necessary. (See Figs. 6 and 9.)

The third stage consists in placing the bar resulting from stages 1 and 2 upon the margins of the plate or plates B, which are bent round to be joined into a pipe, as illustrated by Figs. 3, 7, and 10, or the locking-bar (the product of stages 1 and 2) may be held rigidly while the margins of the plate B are brought into the opposing grooves 3 and 4.

The fourth stage consists in applying pressure to the faces 1 and 2 of the locking-bar A, so as not only to bring the corresponding waved faces $b'$ and $c'$ together, but to crimp the margins of the plate B, causing its material to assume their convexities and concavities, and so effecting the locking-joint and completing the pipe. This fourth stage is illustrated by comparing Figs. 4, 8, 11, and 12 with Figs. 2, 6, and 9.

In the process of manufacture of my improved pipe it has been assumed that the edges of the plates from which the pipes or tubes are manufactured are trued as to thickness and evenness at or about their edges by machining at the works where they are rolled or otherwise as a separate step in the manufacture.

What I claim then is—

The improved manufacture of pipes consisting essentially in forming a bar with a groove in two of its opposing faces, the internal faces of said grooves being waved longitudinally, inserting the plain margins of plates which are bent round to form the pipe into the waved grooves and finally closing the grooves by pressure, so that the inserted margins of the plates are caused to follow the convexities and concavities of the grooved faces, substantially as herein set forth and illustrated.

In witness whereof I have hereunto set my hand in presence of two witnesses.

GEORGE HERBERT LLOYD.

Witnesses:
HAROLD J. C. FORRESTER,
SYDNEY A. LAKE.